United States Patent
Lineberger

(10) Patent No.: US 8,448,190 B2
(45) Date of Patent: May 21, 2013

(54) METHODS, SYSTEMS, AND COMPUTER READABLE MEDIA FOR HIGH RELIABILITY DOWNLOADING OF BACKGROUND ASSETS USING A MANIFEST IN A VIRTUAL WORLD APPLICATION

(75) Inventor: William B. Lineberger, Cary, NC (US)

(73) Assignee: MFV.com, Inc., Cary, NC (US)

( * ) Notice: Subject to any disclaimer, the term of this patent is extended or adjusted under 35 U.S.C. 154(b) by 938 days.

(21) Appl. No.: 12/053,959

(22) Filed: Mar. 24, 2008

(65) Prior Publication Data
US 2009/0241133 A1 Sep. 24, 2009

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................................... 719/320

(58) Field of Classification Search
USPC ................................................... 719/320
See application file for complete search history.

(56) References Cited

U.S. PATENT DOCUMENTS

| | | | |
|---|---|---|---|
| 6,910,186 B2* | 6/2005 | Kim | 715/706 |
| 7,101,284 B2* | 9/2006 | Kake et al. | 463/31 |
| 8,196,050 B2* | 6/2012 | Riley et al. | 715/757 |
| 2005/0179685 A1* | 8/2005 | Kake et al. | 345/419 |
| 2006/0136964 A1* | 6/2006 | Diez et al. | 725/37 |
| 2007/0054695 A1* | 3/2007 | Huske et al. | 455/556.2 |
| 2008/0201638 A1* | 8/2008 | Nair | 715/706 |
| 2009/0199275 A1* | 8/2009 | Brock et al. | 726/4 |

* cited by examiner

Primary Examiner — Emerson Puente
Assistant Examiner — Kimbleann Verdi
(74) Attorney, Agent, or Firm — Jenkins, Wilson, Taylor & Hunt, P.A.

(57) ABSTRACT

The subject matter described herein includes methods, systems, and computer readable media for predictively downloading background assets with file-not-present tolerance in a virtual world application. According to one aspect for high reliability downloading of background assets using a manifest in a virtual world application, the method includes compiling a manifest of assets potentially needed for execution by a first instance of a virtual world application (VWA), wherein each of the assets is associated with a priority. Using the manifest and while executing the VWA, assets listed in the manifest are downloaded based on the priorities indicated in the manifest. The VWA is executed for displaying a virtual world by loading at least a subset of the assets listed in the manifest.

18 Claims, 9 Drawing Sheets

502  504  506     508          510

[+/-]path\filename,[priority],[area_identifier]

+objects\toon\buildings\purple.v3c,1,0
+objects\toon\buildings\lightblue.v3c,1,0
+objects\toon\buildings\fence.v3c,1,0
...
+objects\toon\buildings\textures\purpletextures.jpg,1,0
+objects\toon\buildings\textures\lightbluetextures.jpg,1,0
+objects\toon\buildings\textures\fencetextures.jpg,1,0
...
+Settings\Quality.ini
+Settings\Frontend.ini
+Settings\Video.ini
+appconfig.ini
+flash\login.swf
+fonts\Areal_9.fnt
+images\icon.tga
+Skins\Default\grfx_lobby.wwm
+Images\grfx_lobby.tga
+Skins\default\bk.jpg
+Settings\Sound.ini
+default_keymap.ini
+sounds\includes\interface.sin
+flash\tutorial.swf
-lights.wwm
+Maps\street\cs001_charselect.ilv
+Textures\les\les_concrete001.dds
+effects\textures.inc
-objects\int\maxfish\deerhead.v3B

METHODS, SYSTEMS, AND COMPUTER READABLE MEDIA FOR HIGH RELIABILITY DOWNLOADING OF BACKGROUND ASSETS USING A MANIFEST IN A VIRTUAL WORLD APPLICATION

TECHNICAL FIELD

The subject matter described herein relates to downloading assets for display by a virtual world application. More particularly, the subject matter described herein relates to methods, systems, and computer readable media for high reliability downloading of background assets using a manifest in a virtual world application.

BACKGROUND

A virtual world is a computer simulation of an environment, referred to as a virtual environment, that allows a user to interact with the virtual environment through the use of a variety of interfaces. A virtual world is typically experienced by a user via a display and speakers so that visual and auditory elements are represented to the user. However, virtual worlds may provide other types of information, such as haptic information (i.e. force feedback), to the user as well. Interaction with the virtual environment may be accomplished via manipulation of a conventional keyboard/mouse combination or via a variety of other input devices, such as gloves, touchscreens, microphones, musical instruments, dance mats, etc. One example of a virtual world includes Second Life™ produced by Linden Research, Inc., of San Francisco, Calif.

In order to display a virtual world, many different assets are displayed to the user by a virtual world application (VWA). Virtual world assets may include, for example, 3-dimensional models, textures, sounds, animations, particle effects, fonts, maps, or configuration files. When a VWA is executed, it searches a locally accessible memory location for the assets needed in order to display the portion of the virtual world being viewed by the user. For example, the VWA may load assets from a hard disk drive or other memory device local to the VWA before displaying the virtual world. However, for online VWAs, assets are not initially stored locally. Rather, assets are stored in a remote location, such as a database or web server.

One problem associated with conventional VWAs is that the process of downloading assets once it is determined that they are needed unnecessarily increases the time period between initializing the VWA and displaying the virtual world. A desirable feature of VWAs is for the virtual world to be displayed as soon as possible, typically no longer than 3 minutes after initializing the VWA. Because conventional VWAs download assets on as as-needed basis before displaying the virtual world, the user may experience unsatisfactory delays in displaying the virtual world. This problem may be exaggerated in complex virtual worlds containing a large number and/or variety of assets needed for displaying even small portions of the virtual world.

Another problem with conventional VWAs is that if an asset is needed for execution but has not yet been downloaded, a conventional VWA may continue to operate, thereby leading to undesirable behaviors. Because conventional VWAs may not perform correctly when a desired file is not present, conventional VWAs may be said to lack file-not-present tolerance. For example, a user (via the user's avatar) may approach a virtual building, character, or other object within a virtual world, where the assets needed to display the object have not been downloaded. As a result, the object cannot be immediately displayed until the assets have been downloaded. However, because the virtual world may continue to be displayed, the user may walk through or even past the object before it is displayed. Thus, the user may fail to properly interact with the virtual world because of the lag time associated with downloading assets yet providing no indication to the user that a virtual object exists but has not yet been displayed.

Another problem is that it is difficult to modify an existing VWA for high reliability downloading of background assets when the VWA was not originally designed for this feature. For example, because conventional VWAs expect that all assets will be locally available from the start, complex software coding and debugging may be performed in order to retrofit a background asset downloading system onto a conventional VWA.

Accordingly, in light of the above described difficulties, there exists a need for improved methods, systems, and computer readable media for high reliability downloading of background assets using a manifest in a virtual world application.

SUMMARY

The subject matter described herein includes methods, systems, and computer readable media for predictively downloading background assets with file-not-present tolerance in a virtual world application. According to one aspect, a method for predictively downloading background assets includes compiling a manifest of assets potentially needed for execution by a first instance of a virtual world application (VWA), wherein each of the assets is associated with a priority. Using the manifest and while executing the VWA, assets listed in the manifest are downloaded based on the priorities indicated in the manifest. The VWA is executed for displaying a virtual world by loading at least a subset of the assets listed in the manifest.

According to another aspect, a system is described for high reliability downloading of background assets using a manifest in a virtual world application. The system includes one or more remote assets potentially needed for displaying a virtual world and a manifest listing at least a subset of the remote assets, wherein each of the assets is associated with a priority. A background asset acquisition (BAA) module downloads assets based on the manifest. A first instance of a virtual world application (VWA) displays a virtual world by loading at least a subset of the assets listed in the manifest.

The subject matter described herein may be implemented as a computer readable medium having stored thereon program instructions that when executed by a processor of a computer perform steps. Exemplary computer readable media suitable for implementing the subject matter described herein include disk memory devices, chip memory devices, application specific integrated circuits and programmable logic devices. In addition, a computer readable medium that implements the subject matter described herein may be located on a single device or computing platform. Alternatively, the subject matter described herein may be implemented on a computer readable medium that is distributed across multiple devices or computing platforms.

BRIEF DESCRIPTION OF THE DRAWINGS

Embodiments of the subject matter described herein will now be explained with reference to the accompanying drawings of which:

FIG. 5 is an exemplary manifest suitable for high reliability downloading of background assets using a manifest in a virtual world application according to an embodiment of the subject matter described herein.

DETAILED DESCRIPTION

The subject matter described herein includes methods, systems, and computer readable media for predictively downloading background assets with file-not-present tolerance in a virtual world application. According to one aspect, a system according to the subject matter described herein may be implemented as hardware, software, and/or firmware components executing on one or more components of a system or device configured to predictively download background assets with file-not-present tolerance in a virtual world application.

Figure 1:
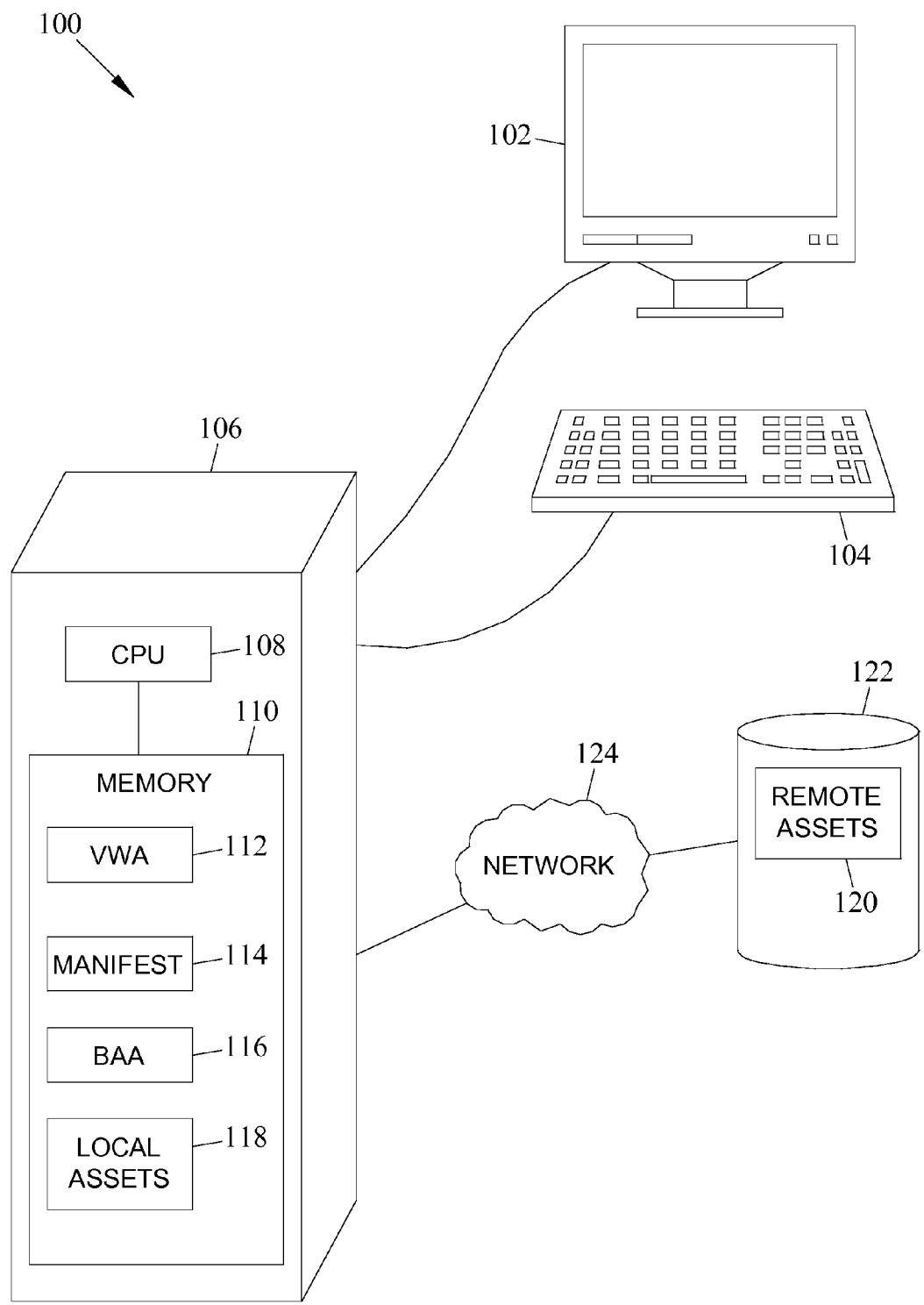
FIG. 1 is a diagram of an exemplary system for high reliability downloading of background assets using a manifest in a virtual world application according to an embodiment of the subject matter described herein.

FIG. 1 is a diagram of a system for high reliability downloading of background assets using a manifest in a virtual world application according to an embodiment of the subject matter described herein. Referring to FIG. 1, system 100 may include various components for displaying a virtual world and predictively downloading background assets. System 100 may include a display 102, keyboard 104, and a computer 106 for allowing a user to see and interact with a virtual world. Computer 106 may include a processor 108 and a memory 110 for storing computer readable instructions that, when executed by processor 108, may perform steps for displaying a virtual world and performing high reliability background downloading of assets. For example, memory 110 may contain virtual world application (VWA) 112 for displaying a virtual world, manifest 114 for listing assets potentially needed for displaying the virtual world, background asset acquisition (BAA) module 116 for predictively downloading assets based on the manifest, and local assets 118 for being loaded by VWA 112 in order to display the virtual world.

Virtual world application 112 may include a computer program, containing instructions that when executed by processor 108 display and manage a virtual world. Displaying the virtual world may include loading one or more assets associated with objects, characters, or environmental effects in the virtual world. Managing the virtual world may include, for example, character creation, user authentication, software update communications. Execution of VWA 112 may include receiving input from keyboard 104 and displaying images and sounds via display 102. In this way, a user may navigate a 3-dimensional virtual environment by controlling an avatar associated with the user and interacting with various virtual objects generated by VWA 112.

It is appreciated that computer 106 may include a personal computer (PC) for executing software code associated with displaying the virtual world to the user. This software may include, but is not limited to, an operating system, video and sound drivers, and VWA 112. VWA 112 may include any files necessary for rendering a virtual world including, but not limited to, dynamic link libraries, maps, textures, videos, sounds, and executable files. Moreover, the responsibility for displaying a virtual world may be distributed between computer 106 and one or more remotely located virtual world servers. Computer 106 may include an input device such as a mouse, microphone, touchscreen, keyboard or any other suitable input means for interacting with a virtual world. Computer 106 may also include an output device, such as a display, printer, and/or speakers for representing the virtual world to the user. Processor 108 and memory 110 may be configured to execute software code suitable for generating a virtual world, including but not limited to an operating system, a web browser, and VWA 112.

Manifest 114 may include a listing of one or more assets needed by VWA 112 for executing a virtual world. For example, assets may include 3-dimensional model data, textures, sounds, animations, particle effects, fonts, maps, and other settings. Assets listed in the manifest may be associated with a priority used to determine the order in which to download the assets listed in the manifest. In one embodiment, a priority may be explicitly associated with the assets listed in manifest 114. For example, manifest 114 may list assets using a comma-delineated format understood by BAA 116. An explicit priority may be associated with each asset by including a priority value after each asset filename listed in manifest 114. In such an embodiment, assets may be listed in manifest 114 in any order, and upon initialization, BAA 116 may scan manifest 114 and begin downloading assets based on their explicitly stated priority values.

In another embodiment, the priority of assets listed in manifest 114 may be implicitly indicated. For example, assets may be simply listed in manifest 114 in order of their priority. Accordingly, upon initialization, BAA 116 may simply begin downloading the first asset listed in manifest 114 and continue downloading assets in the order in which they are listed.

According to another aspect, an exclusion identifier may be associated with assets listed in manifest 114. The exclusion identifier may indicate whether or not an asset should be downloaded. For example, a + symbol may precede each asset listed in manifest 114 indicating that the asset should be downloaded. Conversely, a − symbol may indicate that the asset should not be downloaded. Assets preceded by a − symbol may therefore indicate assets for which no download attempt should be made by BAA 116.

One advantage to including an exclusion identifier in manifest 114 is that existence of a common file is not constantly tested by BAA 116 for files that may not be available for downloading. By skipping these files, congestion of network connection 124 may be avoided and performance of system 100 may be increased. For example, in order to display a particular model in a virtual world, texture assets may be loaded by VWA 112 where VWA 112 may support multiple file types for the same asset. In order to maintain broad compatibility, manifest 114 may list the same asset in multiple file formats. However, because VWA 112 may prefer some file formats over others, it may be unnecessary to download the same texture in multiple formats. In one scenario, VWA 112 may support both bitmap (.BMP) and jpeg (.JPG) image formats. Manifest 114 may therefore list both texture1.bmp and texture1.jpg assets for displaying a virtual object. However, because only one file format is required for displaying texture1, VWA 112 may be configured to load texture1.jpg if it is available. As a result, if both texture1.bmp and texture1.jpg are downloaded, texture1.bmp would be ignored and texture1.jpg would be loaded. This would result in redundant downloading of texture1.bmp. Because many conventional virtual worlds comprise thousands of assets, waste of system resources associated with this redundancy may be compounded. The exclusion identifier therefore prevents the downloading of duplicate file formats listed in manifest 114 by placing a – symbol preceding the asset listing. By adding an exclusion entry in manifest 114, download requests for texture1.bmp may be excluded from reaching remote asset server 122.

According to another aspect, an area identifier may be associated with assets. For example, a virtual world may be comprised of many different "zones", where each zone may possess a unique look and feel. A first set of assets may be required for displaying an entry level zone and a second, third and fourth set of assets may be required for displaying neighboring zones. Because the entry zone is the first zone displayed, the first set of assets may be downloaded first. As the user progresses through the virtual world and discovers new zones, BAA 116 may automatically begin background downloading of assets associated with nearby zones two, three, and four. Implementation of an area identifier may increase the efficiency of downloading assets by allowing BAA 116 to predictively download assets for neighboring zones based on the user's play.

According to another aspect, manifest 114 may either be dynamically compiled or pre-compiled. Dynamically compiling manifest 114 may include generating a listing of assets based on execution of a first instance of VWA 112 by a user. For example, as the user explores the virtual world displayed by WVA 112 for the first time, manifest 114 may be populated with a list of assets for displaying the virtual world. As a result, the list of assets in manifest 114 may be customized based on the user's exploration of the virtual world. It is appreciated that manifest 114 may also be updated based on subsequent execution of VWA 112 so as to further optimize the efficiency of downloading background assets for future executions of VWA 112.

In contrast, statically pre-compiling manifest 114 may include compiling a "master" manifest based on execution of a "master" instance of VWA 112 and distributing the master manifest to client instances of VWA 112. For example, the developer of VWA 112 may execute VWA 112 under exemplary conditions and/or scenarios in order to create an exemplary manifest 114. The exemplary manifest may be distributed to each client user of VWA 112 prior to execution. Distribution may be implemented, for example, via automatic updating mechanisms built into virtual world application 112.

Background asset acquisition (BAA) function 116 may include software instructions for communicating with VWA 112 and manifest 114 in order to predictively download background assets with file-not-present tolerance for loading by VWA 112 to display a virtual world. Predictively downloading background assets may include copying one or more assets from a remote storage location, such as a web server, to a local memory storage device, such as memory 110. In one embodiment, BAA 116 may generate one or more execution threads for copying multiple assets listed in manifest 114 simultaneously. For example, upon initialization of VWA 112, a background "primary thread" may be created for connecting to remote asset storage location 122. The primary thread may spawn a number of "worker threads" for processing assets listed in manifest 114 necessary for VWA 112 to display a virtual world. The primary thread may also handle access requests from VWA 112, which will be described in greater detail below. Assets may be downloaded by the worker threads and seamlessly stored in a holding area and moved to local asset storage location 118 without pausing the execution of VWA 112.

Local assets 118 may include one or more files stored on a computer readable medium, such as memory device 110, that have a file structure suitable for loading by VWA 112 in order to display a virtual world. For example, local assets may include one or more 3-dimensional models, textures, sounds, animations, particle effects, fonts, maps, or other files suitable for displaying a virtual world. It is appreciated that local assets 118 may not comprise every asset necessary for displaying every aspect of the virtual world, but rather those assets downloaded by BAA 116 and available for loading by VWA 112. Local assets therefore include, at a minimum, the assets needed for displaying the portion of the virtual world explored by the user at a given point in time and, at a maximum, all assets associated with displaying the virtual world.

As described above, local assets 118 may be associated with a priority (implicit or explicit), an area identifier, and an exclusion identifier for predictively downloading assets listed in manifest 114. Other features may also be associated with local assets 118 for optimizing the downloading of background assets without departing from the scope of the subject matter described herein.

Remote assets 120 may include one or more files stored at a remote storage location, such as a web server. In an exemplary configuration, remote assets 120 may have a file structure identical to that of local assets 118 suitable for loading by VWA 112 in order to eliminate the need for complex search and translation mechanisms, thereby simplifying the synchronization between remote assets 120 and local assets 118. As described above with respect to local assets 118, remote assets 120 may include one or more 3-dimensional models, textures, sounds, animations, particle effects, fonts, maps, or other data suitable for displaying a virtual world. It is appreciated that remote assets 120 may comprise every asset necessary for displaying the entire virtual world, including optional assets, so that any asset needed by VWA 112 may be retrieved from a central location 122 containing remote assets 120.

Figure 2:
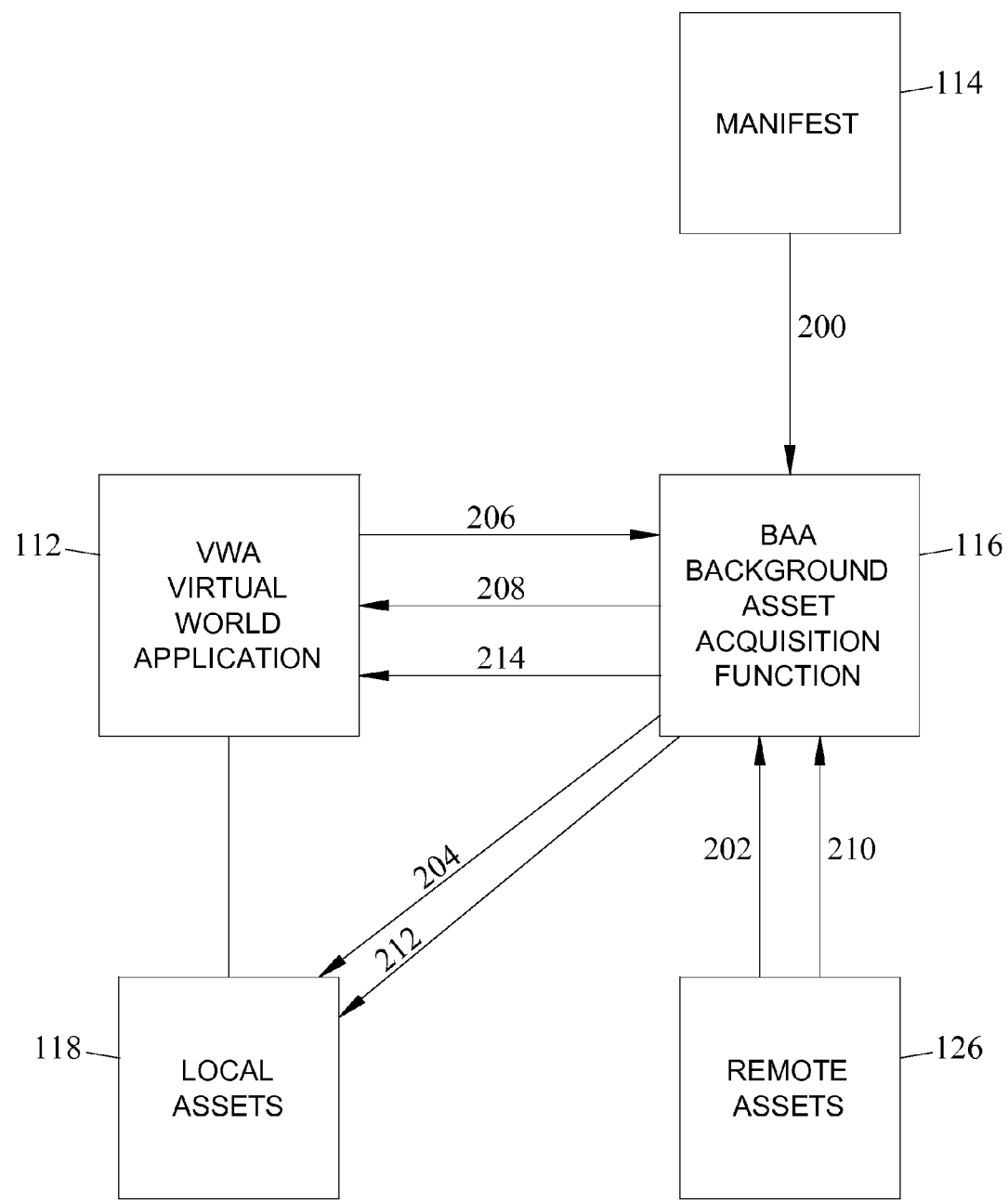
FIG. 2 is a block diagram of an exemplary system for high reliability downloading of background assets using a manifest in a virtual world application according to an embodiment of the subject matter described herein.

FIG. 2 is a block diagram of a system for high reliability downloading of background assets using a manifest in a virtual world application according to an embodiment of the subject matter described herein. Referring to FIG. 2, exemplary steps are shown for downloading assets at a baseline priority and, upon determining that an asset is required by VWA 112 for displaying the virtual world but not yet downloaded, downloading the required asset at an elevated priority.

Generally, it may be appreciated from FIG. 2 that BAA 116 may communicate with remote asset storage location 126 and local asset storage location 118 for downloading assets and storing them in a location suitable for loading by VWA 112 for display in a virtual world. BAA 116 may be configured to read manifest 114 in order to determine, in step 210, which remote assets 120 should be downloaded from remote assets storage location 122. BAA 116 may also communicate with VWA 112 for receiving notification that an asset is required for display of the virtual world, as well as for pausing and unpausing the display of the virtual world while downloading a needed asset at an elevated priority. VWA 112, manifest 114, BAA 116, and local assets 118 may reside on the same computer hardware and may be connected to remote assets 120 via network 124. VWA 112 may load local assets 118 for displaying the virtual world by accessing one or more memory locations in which local assets 118 are stored.

Figure 3:
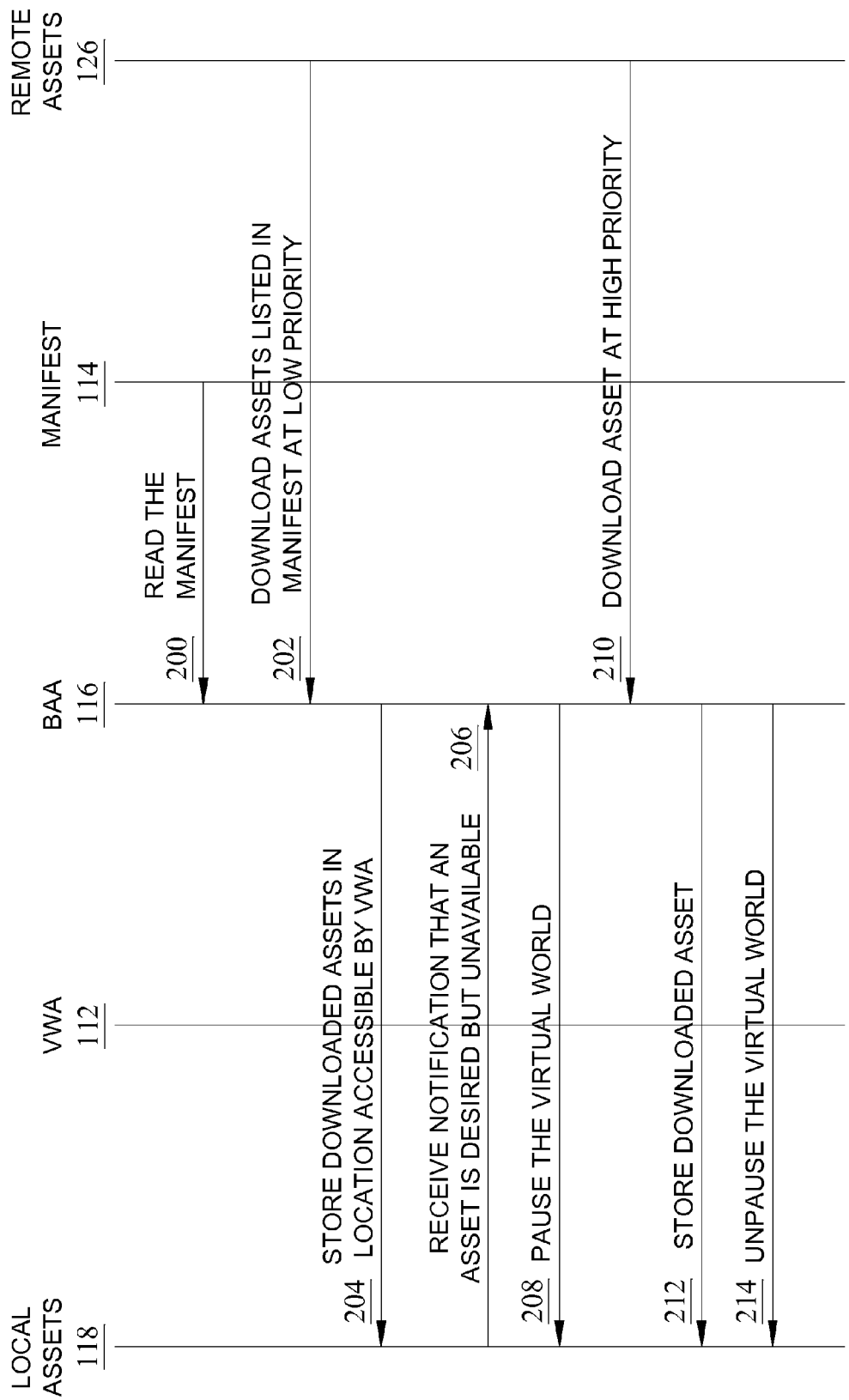
FIG. 3 is a flow chart of an exemplary process for high reliability downloading of background assets using a manifest in a virtual world application according to an embodiment of the subject matter described herein.

FIG. 3 is a flow chart of an exemplary process for performing high reliability downloading of background assets using a manifest in a virtual world application according to an embodiment of the subject matter described herein. Referring to FIG. 3, in step 200, manifest 114 may be read by BAA 116 in order to determine the assets to be downloaded and a priority in which to download them. For example, BAA 116 may read manifest 114 that implicitly prioritizes assets by listing them in order of their priority. It is appreciated, however, that manifest 114 may also explicitly associate a priority with the assets, and/or may include an exclusion identifier and an area identifier for providing more efficient downloading of the assets listing in manifest 114.

In step 202, remote assets 120 may be downloaded at a baseline priority and, in step 204, the downloaded assets are stored in a location directly accessible by VWA 112, such as memory 110. For example, a primary background thread may spawn one or more worker threads for downloading assets listed in manifest 114 based on their priority. In one embodiment, worker threads may have a normal thread priority so as not to interfere with the execution of VWA 112 or other applications residing on computer 106. Assets may be copied from remote asset storage location 122, such as a web server, to a local storage location, such as memory 110.

In step 206, BAA 116 may receive a notification from VWA 112 that an asset is required for displaying the virtual world but is not locally accessible (i.e. has not been downloaded). For example, a user operating in the virtual world may approach a virtual object, such as a building. In order to display the building, one or more assets must be loaded by VWA 112 associated with, for example, wall textures, window textures, and floor textures. As the user approaches the virtual object, he may enter a line of sight for the object, after which the object is to be displayed and before which, there is no need for the object to be displayed. Upon reaching this line of sight boundary, VWA 112 may search local assets 118 for the assets associated with displaying the virtual building. If any needed asset has not yet been downloaded (i.e., is not located in local assets 118), the process may proceed to step 208.

In step 208, the virtual world may be paused while waiting for the needed asset to be downloaded. Continuing the example, the user may be prevented from moving within the virtual world for a brief period of time. This may be experienced as an extended "file loading" where computer 106 may appear to be simply accessing its hard disk drive.

In response to determining that an asset is immediately required by VWA 112 for displaying the virtual world but not yet downloaded, BAA 116 may download the asset at an elevated priority in step 210 and, in step 212, store the asset locally. After the asset has been downloaded, in step 214, the display of the virtual world may be unpaused. For example, BAA 116 may increase the thread priority of the worker thread associated with downloading the missing asset(s) and after successfully copying the assets to memory 110, BAA 116 may send a signal to VWA 112 indicating that the missing assets are ready for loading and instructing VWA 112 to unpause display of the virtual world.

Figure 4:
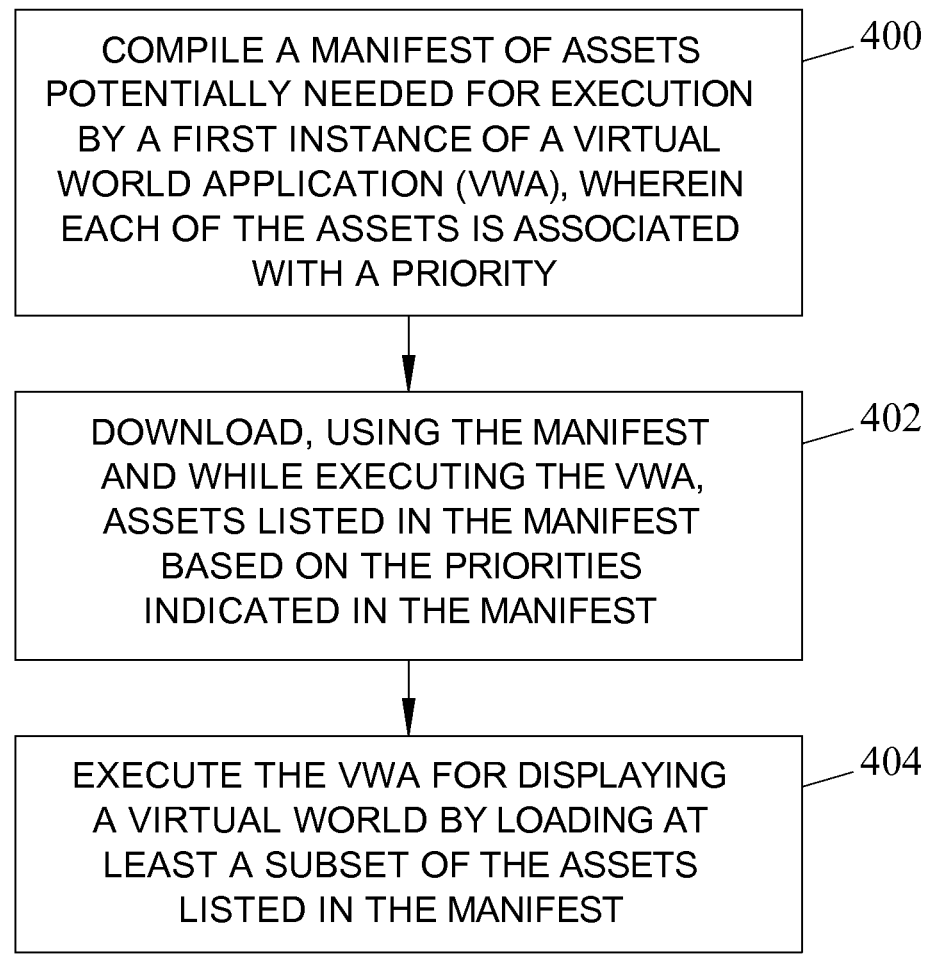
FIG. 4 is a flow chart of an exemplary process for high reliability downloading of background assets using a manifest in a virtual world application according to an embodiment of the subject matter described herein.

FIG. 4 is a flow chart of an exemplary process for high reliability downloading of background assets using a manifest in a virtual world application according to an embodiment of the subject matter described herein. Referring to FIG. 4, in block 400, a manifest of assets potentially needed for execution by a virtual world application (VWA) is compiled, wherein each of the assets in the manifest is associated with a priority.

In block 402, assets listed in the manifest are downloaded, using the manifest and while executing the VWA, based on the priorities indicated in the manifest. The assets may be downloaded based on either an implicit or an explicit priority, or a combination thereof. Furthermore, assets may be downloaded, in part or in whole, based on an area identifier associated with the assets. Assets may also be excluded from being downloaded based on an exclusion identifier that may optionally be associated with each asset.

In one embodiment, the amount of time waiting for assets to be downloaded may be further minimized through the use of strategically located pause points. Pause points may be seamlessly integrated into VWA 112 and configured to occupy the user's attention while assets are downloaded for displaying the virtual world. For example, pause points may include, but are not limited to, login screens, mini games, elevators, and trains. In one scenario, it is assumed that a user entering a virtual world must first create a character name, choose various character attributes such as race, gender, skills, clothing etc. before entering the virtual world for the first time. This process may take anywhere from a few seconds to a several minutes. However, during this time, BAA 116 downloads assets needed to display the virtual world so that as soon as the user has completed the character creation process the virtual world may be immediately displayed.

In one implementation, an application programming interface (API) may be provided to VWA 112 for processing asset acquisition requests. Upon initialization, a primary background thread may be spawned for connecting to remote assets storage location 122. The primary thread may also be configured to process access requests from VWA 112 for downloading assets from remote location 122 and storing the assets in their "true" locations (i.e. local assets 118 on computer 106) seamlessly and without pausing the execution of the virtual world. The primary thread may also spawn one or more "worker threads" that may begin downloading assets listed in manifest 114 based on their priority.

Exemplary software code is shown below for illustrating one possible implementation of suitable application program interface (API) function calls for performing high reliability downloading of background assets using a manifest in a virtual world application.

int ICFILE_Initialize(LPCTSTR cApplicationName, LPCTSTR cBaseUrl, DWORD dwworkerThreads);

ICFILE_Initialize function may be called by VWA 112 in order to begin the process of downloading assets in the background. An application identifier, such as "ApplicationName," may be provided to remote asset storage web site 122 for identifying and authorizing VWA 112. For example, remote assets storage location 122 may contain assets used by more than one VWA 112. Therefore, it may be advantageous or necessary for remote web site 122 to identify VWA 112 in order to deliver the correct assets. A base uniform resource locator (url), "BaseUrl," may be provided for indicating the root of the file structure storing remote assets 122, where the remote asset file structure may be identical to local asset file structure 118. Thus, when a file requested by VWA 112 is not located in local assets 118, the asset may be found in remote assets 120 without the need for complex file search or translation mechanisms.

void ICFILE_LoadFromManifest(LPCTSTR pName, DWORD iFlags);

Upon initialization, VWA 112 may inform BAA 116 of the assets potentially needed for displaying a virtual world by calling ICFILE_LoadFromManifest. Downloading assets listed in manifest 114 may immediately begin for assets which are not locally stored without pausing the primary program. For example, a primary background thread may spawn one or more worker threads configured to download remote assets based on their priority. Worker threads may have a normal priority so as not to interfere with the execution of VWA 112 or other applications residing on computer 106.

ICFILE *ICFILE_DownloadFile(LPCTSTR pRemoteFile, LPCTSTR pLocalFile, DWORD iPriority, DWORD dwFlags);

ICFILE_DownloadFile function may begin the downloading of an asset. RemoteFile identifier and LocalFile identifier may indicate the path and filename of the asset to be downloaded. iPriority may indicate a priority to be used for downloading the asset. For example, iPriority may be elevated in order for VWA 112 to give higher importance to critical files. The Flags parameter may indicate things such as, but not limited to, whether or not to cache the file locally, whether or not to retry the download if it fails, and whether or not to treat the filename as case sensitive.

It is appreciated that ICFILE_DownloadFile may return immediately in order to notify BAA 116 and VWA 112 that a download attempt has already occurred for the asset being requested and the asset is not present. By notifying BAA 116 and VWA 112 of this condition, multiple unnceccesary requests for the asset may be eliminated, thereby reducing local on remote asset server 122. Alternatively, BAA 116 and VWA 112 may be notified that the asset has been downloaded and is present in local assets 118. A priority value may also be available so that BAA 116 may process critical files at an elevated priority.

ICFILE *ICFILE_WaitFor(LPCTSTR pName);

ICFILE_WaitFor is a simple form of a wait call for enabling VWA 112 to simulate a long file load time while downloading a needed asset in the background at an elevated priority. As described above, this wait call may have the effect of pausing the display of the virtual world so that program flow is uninterrupted and undesirable behaviors associated with conventional systems are avoided.

void ICFILE_ReleaseFile(ICFILE *pFile);

Conversely, ICFILE_ReleaseFile may be used to release a file associated with a file request instantiated by ICFILE_DownloadFile. By releasing the asset, display of the virtual world may be unpaused after downloading the asset. For example, ICFILE_ReleaseFile may notify BAA 116 that asset "File" has been downloaded and released and that VWA 112 may load the asset locally in order to display the virtual world.

int ICFILE_IsCompleted(TCHAR *pName);

ICFILE_IsCompleted may query BAA 116 to determine whether an asset has been downloaded from remote assets 120 and installed as local assets 118. In one embodiment, VWA 112 may be programmed to be more knowledgeable about the assets being downloaded. As a result, VWA 112 may not have to wait on an asset to be completely downloaded and available as a local asset 118 before allowing the display of a virtual world to continue. For example, VWA 112 may be configured to display a "thumbnail" or "miniature" version of a texture until the asset has fully downloaded instead of waiting for the texture to complete.

In response to determining that an asset is not available, the asset may be downloaded using an elevated priority. For example, a new function ICFILE_SetPriority(LPCTSR pName, DWORD ipriority) may be introduced for setting the priority of a file in the download request list (i.e. manifest). When a thread is ready to download the "next" file in the download request list, the thread may download the file having the highest priority that has been in the list for the longest period of time. Thus, the "next" file to be downloaded may be determined based on a combination of its priority value and its time on the list waiting to be downloaded. This function call may be used to elevate the priority of an existing download. For example, the priority of a file may be elevated while BAA 116 is processing files listed in the manifest when VWA 112 determines that the file is needed sooner than it would be downloaded at a normal priority.

The numbering scheme used for indicating a priority value may be arbitrarily chosen. In one embodiment, 0 may represent basic list entries from the original manifest, 1 may represent files added by the program manually (i.e., where a file is requested and was missing from the manifest), and 2 may represent critical files that the application requires. Using the multi-zone virtual environment example described above, a 0 priority value may be associated with files used for displaying virtual objects outside of the current zone, 1 may be used for downloading files associated with the current zone, and 2 may be used for files requested by the program after the manifest has been created.

In block 404, the VWA is executed, wherein executing the VWA includes loading at least a subset of the assets listed in the manifest. For example, a virtual world may be displayed which includes a variety of objects, characters, and other effects associated with representing the virtual environment to the user. Each virtual object may be associated with one or more assets necessary for display. These assets may include, but are not limited to, a model, a texture, a sound, an image, a font, a configuration, a particle effect, and an animation asset.

FIG. 5 is an exemplary manifest suitable for high reliability downloading of background assets using a manifest in a virtual world application according to an embodiment of the subject matter described herein. Referring to FIG. 5, manifest 500 may include one or more parameters and/or arguments for listing assets and other information suitable for providing file-not-present tolerant background asset downloading. It is appreciated that while manifest 500 illustrates an abbreviated listing of exemplary assets for displaying a virtual world, manifest 500 may include an extremely large but finite number of assets without departing from the scope of the subject matter described herein. In exemplary manifest 500, each asset may be delineated by listing the asset on a separate line. However, it is appreciated that other methods for delineating assets may also be used.

Exclusion identifier 502 may precede each asset listing to indicate whether the asset should be processed or skipped. For example, a + symbol may indicate that the asset should be processed while a − symbol may indicate for BAA 116 to skip downloading the asset. One advantage to including exclusion identifier 502 for assets listed in manifest 114 is that existence of a common file that may not be available for downloading is not constantly tested as BAA 116 processes manifest 114. By skipping these files, congestion of network connection 124 may be avoided and performance of system 100 may be increased.

Exclusion identifier 502 may be followed by path 504 and filename 506 identifying the asset within a file structure. As described above, path 504 and filename 506 file structure used in manifest 500 may identically mirror the path and filename structure of local assets 118 accessed by VWA 112 for displaying the virtual world. By synchronizing the path and filename structures between manifest 500 and local assets 118, translation times may be minimized or eliminated, thereby reducing the complexity and increasing the speed of system 100.

Optional argument 508 may explicitly indicate a priority value associated with the asset, for allowing BAA 116 to download assets in manifest 500 based on a stated priority 508 rather than the priority implied by the order in which they are listed. An optional area identifier 510 may also be included in manifest 500 for associating an asset with a particular virtual world area or zone. BAA 116 may use area identifier 510 in order to download assets associated with zones likely to be displayed first, and/or to download assets for nearby zones before downloading assets associated with zones unlikely to be seen by the user.

Figure 6A:
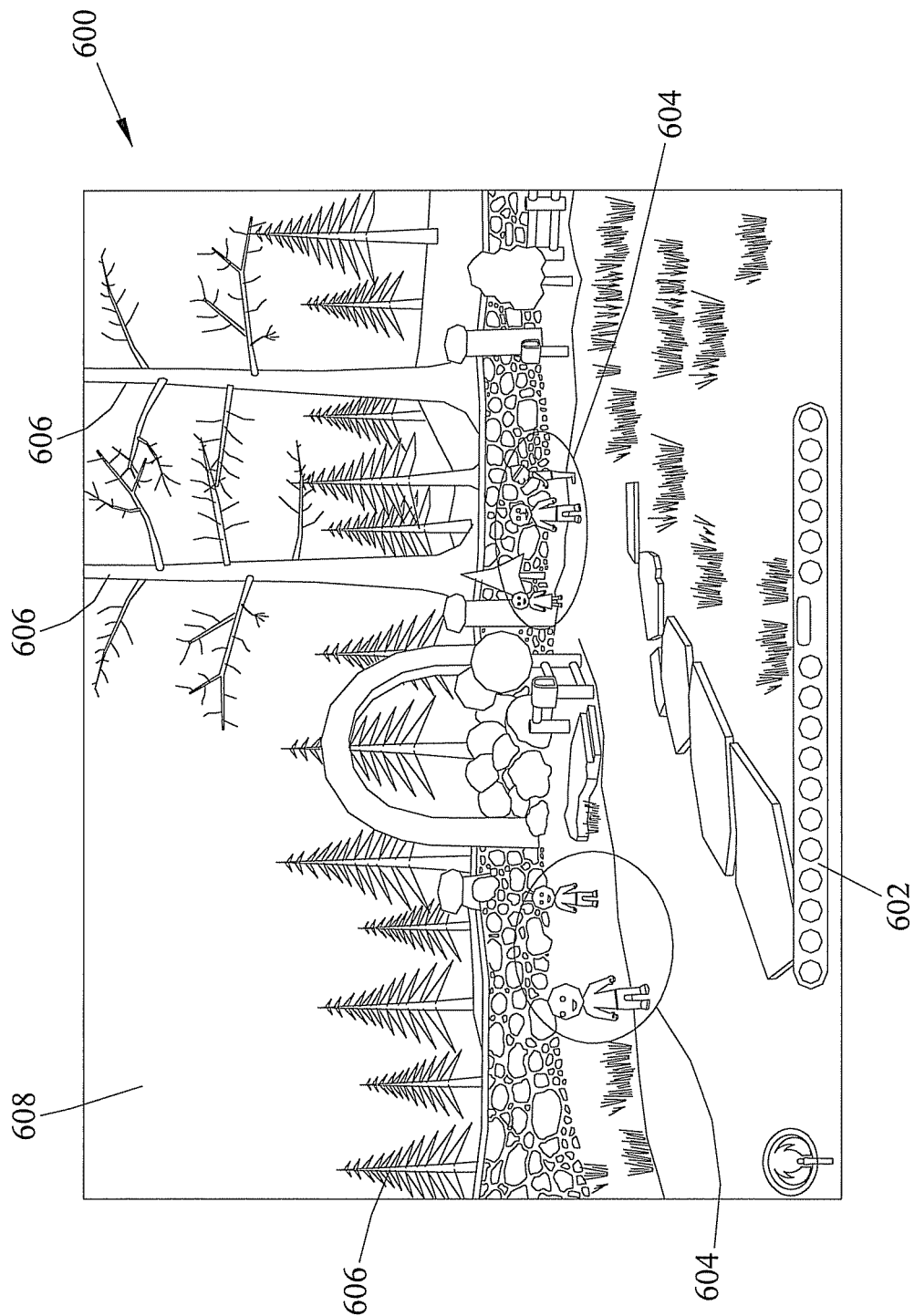
FIGS. 6A-6D are screenshots of an exemplary virtual environment implementing high reliability downloading of background assets using a manifest according to an embodiment of the subject matter described herein.

FIGS. 6A-6D are screenshots of an exemplary virtual environment implementing high reliability downloading of background assets using a manifest according to an embodiment of the subject matter described herein. Referring to FIG. 6A, virtual world 600 may include user interface elements 602 for interacting with the virtual world, player avatars 604 associated with other users within the virtual world, and environmental objects such as trees 606 and sky 608 for populating the virtual world. Because virtual world elements 602-606 are displayed in initial screenshot 600, it is appreciated that the elements represent a set of objects that have already been read from manifest 114, downloaded from remote assets 120, loaded by VWA 112 and displayed to the user. Therefore screenshot 600 may represent a partially completed display of a virtual world seen from the user's perspective as the user navigates through a particular area. However, one or more objects which may exist in virtual world 600 but have yet to be downloaded and displayed before virtual world scene 600 is completed. The process of predictively downloading the remaining virtual world objects will be described in greater detail below with respect to FIGS. 6B-6D.

Figure 6B:
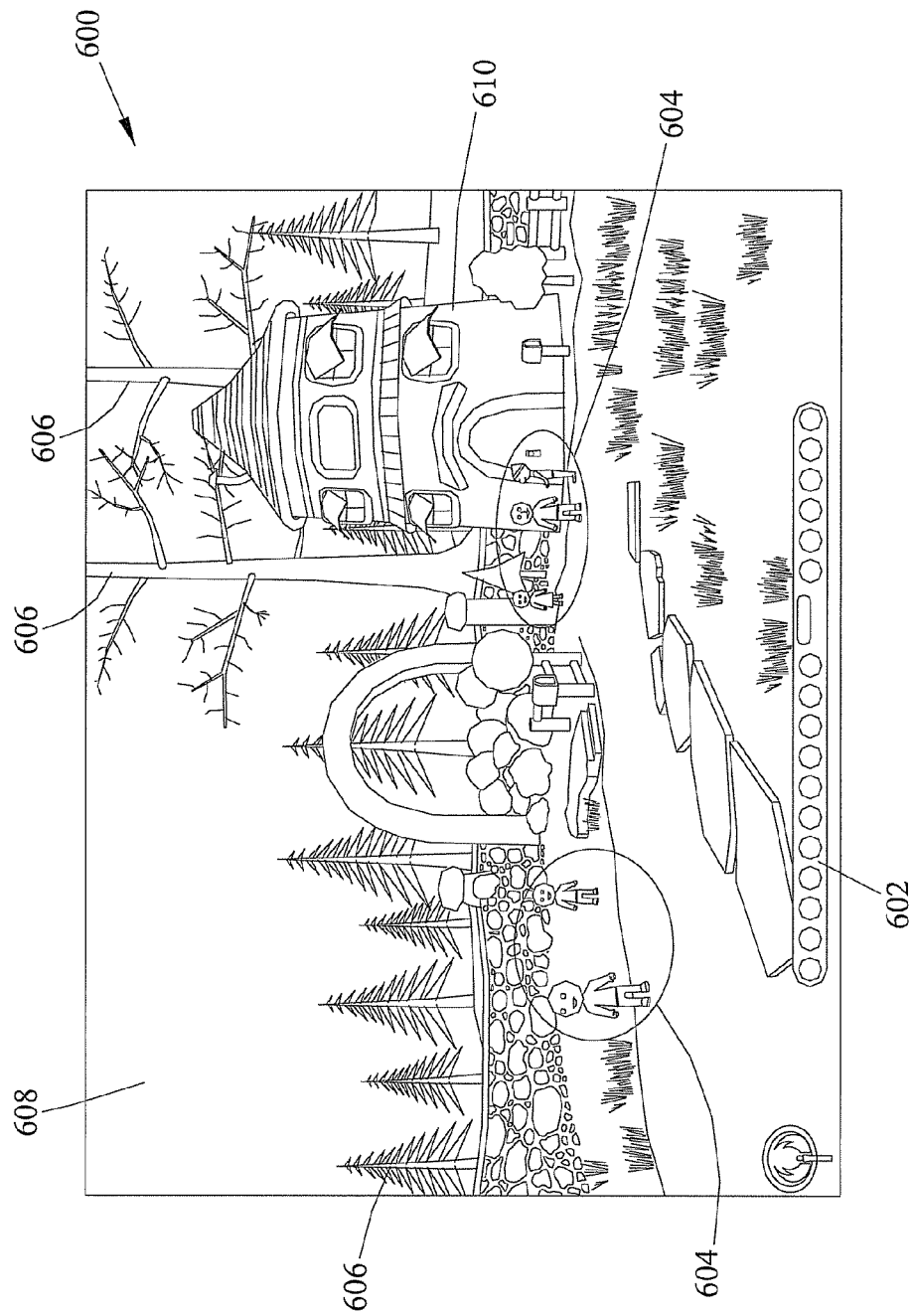

In FIG. 6B, a first virtual building 610 may be loaded and displayed. While screenshot 600 is a black and white image, it may be appreciated that virtual world 600 may be displayed in color and that building 610 may be purple. Assets associated with virtual building 610 may be listed in manifest 114 and loaded prior to the user entering the area or may be downloaded at an elevated priority if VWA 112 determines that the objects are required but not yet downloaded. For example, the first line in manifest 114 may include the path and file name "objects\toon\buildings\purple.v3c, 1,0" corresponding to building 610. Thus, while processing manifest 114, BAA 116 may reach asset "purple.v3c" and begin downloading the asset in the background for eventual display with the virtual world.

Figure 6C:
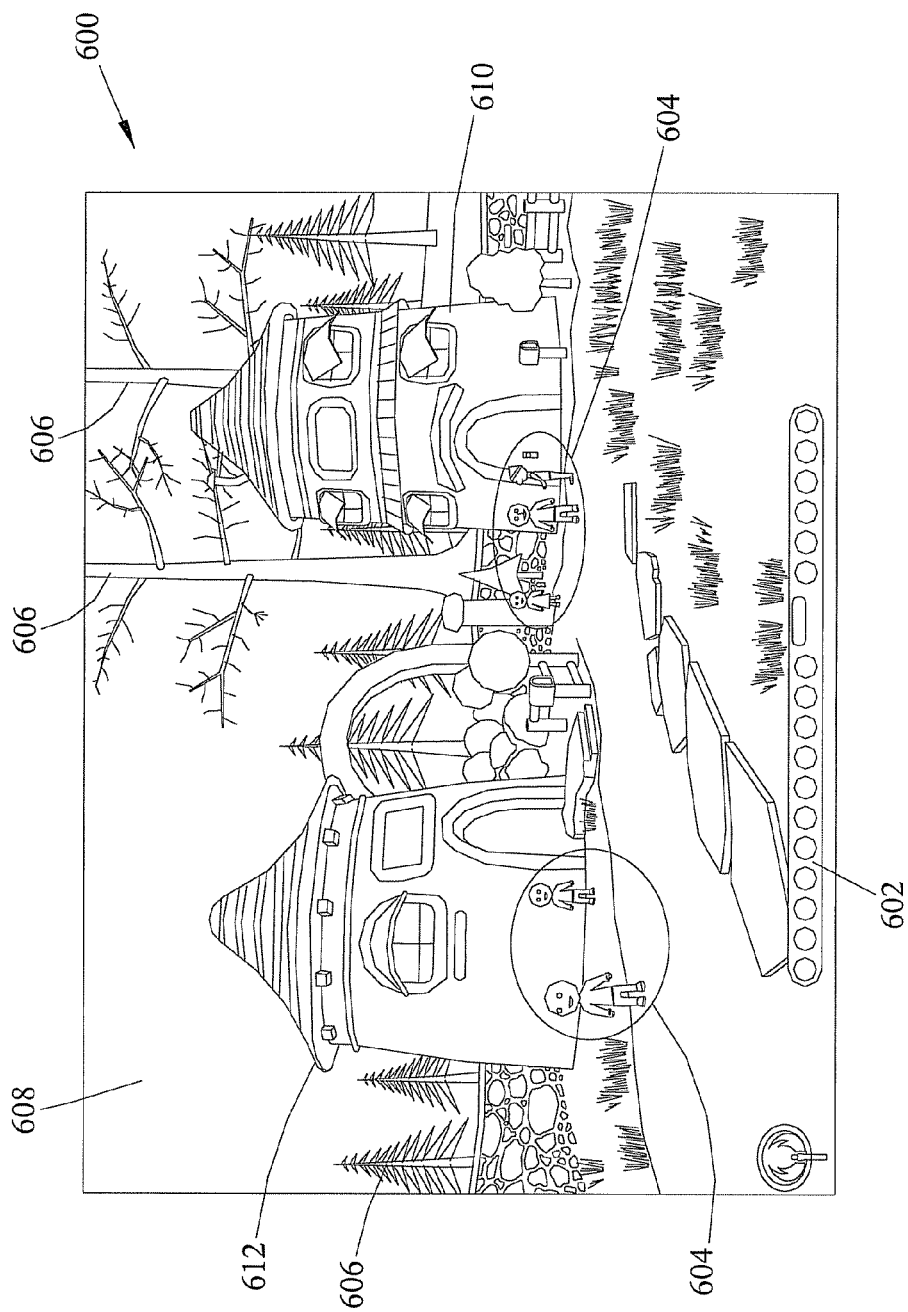

In FIG. 6C, a second virtual building 612 may be loaded and displayed. It is appreciated that if the user approaches or attempts to interact with second virtual building 612 before its assets have been downloaded and displayed, BAA may instruct VWA 112 to pause the virtual world environment while the required asset is downloaded at an elevated priority (i.e. 1). In this way, unexpected and/or undesirable system behaviors may be avoided with minimal interruption to the user experience. For example, the second line in manifest 114 may include the path and file name "objects\toon\buildings\lightblue.v3c, 1,0" corresponding to virtual building 612.

Figure 6D:
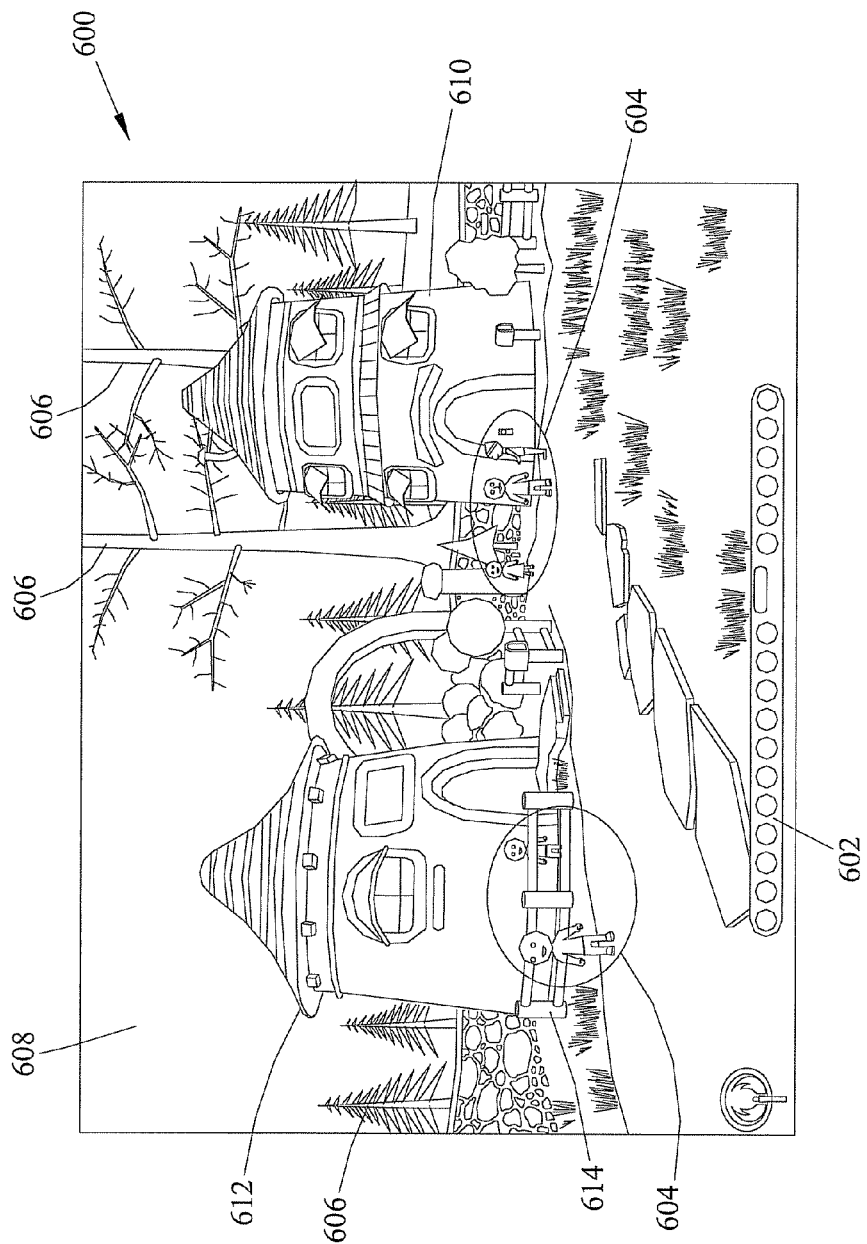

Finally, in FIG. 6D, a virtual fence object 614 may be loaded and displayed in order to complete virtual scene 600. For example, the third line in manifest 114 may include the path and file name "objects\toon\buildings\fence.v3c, 1,0" corresponding to virtual fence 614.

It is appreciated that because manifest 114 files have a base priority (i.e., 0), characters in scene 600 may have been preemptively downloaded because the system has manually requested them. According to one possible aspect, texture files associated with buildings 610-612 may initially be downloaded using smaller, lower-resolution textures and used to display buildings 610-612. Full, high-resolution textures may be downloaded in the background after the buildings have been displayed using the lower resolution textures. This allows virtual objects to appear in scene 600 faster by initially displaying the objects with a lower quality texture that can be downloaded faster. When manifest 114 completes the downloading of the higher resolution textures, the lower resolution textures may be replaced with the higher quality images.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for high reliability downloading of background assets using a manifest in a virtual world application (VWA), the method comprising:
compiling the manifest of the assets potentially needed for execution by a first instance of the VWA, wherein each of the assets is associated with a priority;
downloading, using the manifest and while executing the first instance of the VWA, the assets listed in the manifest based on the priorities indicated in the manifest, wherein downloading the assets includes downloading the assets based on an area identifier associated with each of the assets in the manifest, wherein the area identifier associates each of the assets with a particular virtual world area or zone, wherein the first instance of the VWA produces a virtual world including a plurality of different zones, each of the plurality of different zones having a distinct look and feel, wherein a first set of the assets is required for displaying a first zone of the plurality of different zones and a second set of the assets is required for displaying a second zone of the plurality of different zones, the second zone comprising a neighboring zone of the first zone, and wherein downloading the assets based on the area identifier associated with each of the assets includes predictively initiating background downloading of the second set of the assets based on a user's play while the user is in the first zone; and
executing the first instance of the VWA for displaying the virtual world by loading at least the first set of the assets and the second set of the assets listed in the manifest.

2. The method of claim 1, further comprising determining that one of the assets is required by the first instance of the VWA for displaying the virtual world and has not been downloaded and, in response to determining that the one of the assets is required and has not been downloaded, pausing the displaying of the virtual world while downloading the one of the assets using an elevated priority and unpausing the displaying of the virtual world upon downloading the one of the assets.

3. The method of claim 1, wherein compiling the manifest includes pre-compiling the manifest by creating a master manifest based on execution of a second instance of the VWA under likely usage conditions and distributing the master manifest to the first instance of the VWA.

4. The method of claim 1, where compiling the manifest includes dynamically compiling the manifest based on execution of the first instance of the VWA.

5. The method of claim 1, wherein compiling the manifest includes implicitly associating the priorities with each of the assets by listing the assets in the manifest in order of their priorities.

6. The method of claim 1, wherein compiling the manifest includes explicitly associating the priorities with each of the assets listed in the manifest.

7. The method of claim 1, wherein compiling the manifest includes associating the area identifier with at least some of the assets.

8. The method of claim 1, wherein compiling the manifest includes compiling the manifest including at least one of a model, a texture, a sound, an image, a font, a configuration, a particle effect, and an animation asset.

9. The method of claim 1, further comprising inserting one or more pause points in the first instance of the VWA, wherein the pause points occupy a user's attention while the assets listed in the manifest are downloaded.

10. A system for high reliability background downloading using a manifest in a virtual world application (VWA), the system comprising:
    a plurality of remote assets, being stored in a memory, potentially needed for displaying a virtual world;
    the manifest, being stored in the memory, listing the remote assets, wherein each of the remote assets is associated with a priority, wherein the manifest includes an area identifier associated with each of the remote assets;
    a background asset acquisition (BAA) module, being stored in the memory and executed by a processor, for downloading the remote assets based on the manifest, wherein the background asset acquisition module is configured to download the remote assets based on the area identifier associated with each of the remote assets in the manifest, wherein the area identifier associates each of the remote assets with a particular virtual world area or zone, wherein the VWA produces the virtual world including a plurality of different zones, each of the plurality of different zones having a distinct look and feel, wherein a first set of the remote assets is required for displaying a first zone of the plurality of different zones and a second set of the remote assets is required for displaying a second zone of the plurality of different zones, the second zone comprising a neighboring zone of the first zone, and wherein downloading the remote assets based on the area identifier associated with each of the remote assets includes predictively initiating background downloading of the second set of the remote assets based on a user's play while the user is in the first zone; and
    a first instance of the VWA for displaying the virtual world by loading at least the first set of the remote assets and the second set of the remote assets listed in the manifest.

11. The system of claim 10, wherein the background asset acquisition module is configured to determine that one of the remote assets is required by the first instance of the VWA for displaying the virtual world and has not been downloaded, and in response to determining that the one of the remote assets is required and has not been downloaded, pausing the displaying of the virtual world while downloading the one of the remote assets using an elevated priority and unpausing the displaying of the virtual world upon downloading the one of the remote assets.

12. The system of claim 10, wherein the manifest is precompiled and includes a listing of the remote assets generated based on execution of a second instance of the VWA under likely usage conditions.

13. The system of claim 10, wherein the manifest is dynamically compiled and includes a listing of the remote assets generated based on execution of the first instance of the VWA.

14. The system of claim 10, wherein the manifest lists the remote assets in order of their priorities.

15. The system of claim 10, wherein the manifest includes an explicit priority associated with each of the remote assets listed in the manifest.

16. The system of claim 10, wherein the manifest includes at least one of a model, a texture, a sound, an image, a font, a configuration, a particle effect, and an animation asset.

17. The system of claim 10, wherein the first instance of the VWA includes one or more pause points, wherein the pause points occupy a user's attention while the remote assets listed in the manifest are downloaded.

18. A non-transitory computer readable medium containing a computer program, executable by a processor, the computer program comprising executable instructions for:
    compiling a manifest of assets potentially needed for execution by a first instance of a virtual world application (VWA), wherein each of the assets is associated with a priority;
    downloading, using the manifest and while executing the first instance of the VWA, the assets listed in the manifest based on the priorities indicated in the manifest, wherein downloading the assets includes downloading the assets based on an area identifier associated with each of the assets in the manifest, wherein the area identifier associates each of the assets with a particular virtual world area or zone, wherein the first instance of the VWA produces a virtual world including a plurality of different zones, each of the plurality of different zones having a distinct look and feel, wherein a first set of the assets is required for displaying a first zone of the plurality of different zones and a second set of the assets is required for displaying a second zone of the plurality of different zones, the second zone comprising a neighboring zone of the first zone, and wherein downloading the assets based on the area identifier associated with each of the assets includes predictively initiating background downloading of the second set of the assets based on a user's play while the user is in the first zone; and
    executing the first instance of the VWA for displaying the virtual world by loading at least the first set of the assets and the second set of the assets listed in the manifest.

* * * * *